Patented June 11, 1946

2,401,868

UNITED STATES PATENT OFFICE 2,401,868

TETRAKISAZODYESTUFFS

Josef Gyr and Raymond Gunst, Basel, Switzerland, assignors to Society of Chemical Industry in Basle, Basel, Switzerland, a Swiss firm No Drawing. Application September 1, 1942, Serial No. 456,921. In Switzerland September 2, 1941

3 Claims. (Cl. 260—166)

It has been found that the azo-dyestuffs, previously unknown, which, in the free form, correspond to the general formula

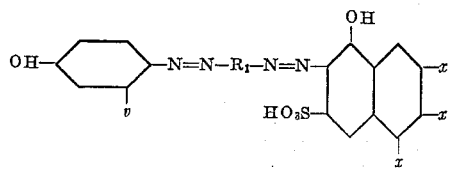

in which $R_1$ represents an aromatic nucleus selected from the group consisting of the aromatic nuclei of the benzene and the naphthalene series, in which the two azo groups are placed in a position other than the 1:2-position to each other, and furthermore, in which $v$ represents an OH- or an $NH_2$-group, two of the $x$-groups represent hydrogen atoms and one $x$ represents a disazo radical of the general formula

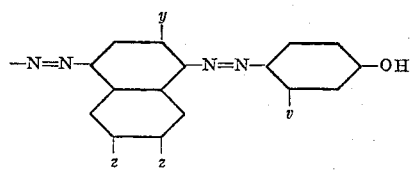

in which latter $v$ has the significance already given, $y$ represents a hydrogen atom or an alkoxy group and in which one $z$ represents a hydrogen atom and the other $z$ a hydrogen atom or an $SO_3H$-group, are valuable products which dye vegetable fibres or artificial fibres of regenerated cellulose, if necessary, in admixture with other fibres, in valuable deep shades, the properties of which, especially those of fastness to wet treatments and of colour tone, can be appreciably improved by aftertreatments, for example, with formaldehyde or with diazo compounds.

These azo dyestuffs can be prepared by the methods usually adopted for the preparation of such products. Thus, for example a diazo compound of the benzene or naphthalene series which, if required, in addition to other substituents, contains a group capable of being converted into an amino group, such as a nitro- or an acidylamino-group in the meta or para position to the diazo group, may be united, in alkaline medium, with a hydroxy-naphthalene sulphonic acid of the general formula

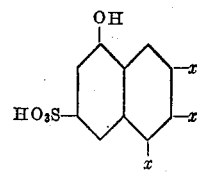

in which one $x$ represents a primary amino group and the other $x$-groups are hydrogen atoms, the monoazo dyestuff thus obtained can then be further diazotized and united with a so-called "middle component" of the naphthalene series, after which the convertible group of the first component can be converted into an amino group and, finally, the diamino-disazo dyestuff thus obtained tetrazotized and coupled with 2 mols of 1:3-dihydroxybenzene or 1-amino-3-hydroxybenzene.

Preferred dyestuffs according to this invention are those which, in the free form, correspond to the general formula

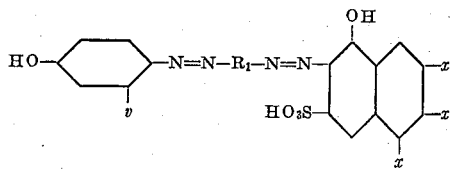

in which $R_1$ represents a phenylene radical, in which the two azo-groups are placed in the 1:4 position to one another, further in which two of the groups symbolized by $x$ are hydrogen atoms and one $x$ represents a disazo radical of the general formula

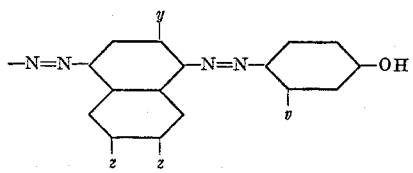

in which $y$ represents a member of the group consisting of hydrogen, methoxy and ethoxy groups, $v$ represents a member selected from the group consisting of $NH_2$ and OH, and in which one $z$ represents a hydrogen atom and the other $z$ a member of the group consisting of H and $SO_3H$.

Substances which can be employed as diazotizing components are, for example, 1-amino-4- nitrobenzene, 1-amino-3-nitrobenzene, 1-amino-4-acetylaminobenzene, 4 - amino - phenyloxamic acid, 1-amino-3-acetylaminobenzene, 1-amino-2-methyl- or 2-methoxy-4-nitrobenzene, 1-amino-2-methyl-5-nitrobenzene, 1-amino-2-methoxy-5-nitrobenzene, 1-acetylamino-2-methoxy-5-aminobenzene, 1-acetylamino-2-methoxy-4-nitrobenzene, or sulphonic acids of such compounds, 1-amino-4-nitronaphthalene-6- or -7-sulphonic acid, 1-amino-4-acetylaminonaphthalene-6- or -7-sulphonic acid, etc.

As hydroxynaphthalene sulphonic acids, the following can be employed: 1-amino-5-hydroxynaphthalene-7-sulphonic acid, 2-amino-5-hydroxynaphthalene-7-sulphonic acid, 2-amino-8-hydroxynaphthalene-6-sulphonic acid.

Finally, as middle components of the naphthalene series, the following compounds can be employed: 1-aminonaphthalene, 1-amino-6- or -7-sulphonic acid or a technical mixture of these two acids, also 1-amino-2-methoxy- or -2-ethoxy-naphthalenes or their 6- or 7-sulphonic acids.

All the dyestuffs which correspond to the general formula explained at the outset, possess, as already mentioned, a pronounced affinity for the cellulose fibre, either in the form of natural cellulose or as regenerated cellulose, such as cuprammonium or viscose rayon, if required, in the form of material delustred with inorganic pigments, as staple fibres or as composite materials, for example, in admixture with cotton or other fibres.

The shades obtainable with the new dyestuffs are from red- to grey-violet, dark brown and olive green. By after-treatment with formaldehyde, the shades of the dyeings are not greatly affected, but development with diazotized para-nitraniline can cause a strong alteration in shade.

The following examples, which can be carried out with all other components named in the specification in addition to those particularly specified, give more detailed information regarding the preparation of these dyestuffs, their properties and their application.

*Example 1*

23.9 parts of 2-amino-8-hydroxynaphthalene-6-sulphonic acid are dissolved in 300 parts of water with the addition of 30 parts of sodium carbonate. To this solution is added the solution obtained by the diazotization of 15.0 parts of 1-amino-4-acetaminobenzene. After stirring for several hours, the coupling mixture is neutralized with hydrochloric acid, a solution of 6.9 parts of sodium nitrite is added and, at 15° C., 28 parts of hydrochloric acid of 30 per cent strength are poured in quickly. After 1 to 1½ hours, ice is added to the diazotizing mixture, and a solution of 14.3 parts of 1-aminonaphthalene, prepared by dissolving it in 300 parts of water with addition of 13 parts of hydrochloric acid of 30 per cent strength, is added in such a manner that the temperature does not rise above 20° C. The coupling mixture is then made neutral to Congo red by addition of sodium acetate solution of 20 per cent strength. After about 30–40 hours, when the coupling is complete, the reaction mixture is heated to 60° C., and the disazo dyestuff is separated by filtration. The pressed dyestuff is then stirred up with 1400 parts of water, the suspension is brought to the boil, 220 parts of sodium hydroxide solution of 30 per cent strength are added, and the whole is stirred at the boil of 1–1½ hours. The reaction mixture is then neutralized with hydrochloric acid and cooled to 15° C., and the diamino-disazo dyestuff solution is mixed with a solution of 13.8 parts of sodium nitrite and 55 parts of hydrochloric acid of 30 per cent strength and stirred for 1½–2 hours at 15° C. The suspension thus obtained is then stirred into a solution of 22.0 parts of 1:3-dihydroxybenzene and 60 parts of sodium carbonate in 300 parts of water. The reaction mixture is stirred for several hours at room temperature, whereupon the greater part of the alkali carbonate is neutralized with hydrochloric acid and the dyestuff is filtered off. After separating and drying, it is a dark, bronzy powder which dissolves in water with a violet and in concentrated sulphuric acid with a blue colour. It corresponds, in the free state, to the formula

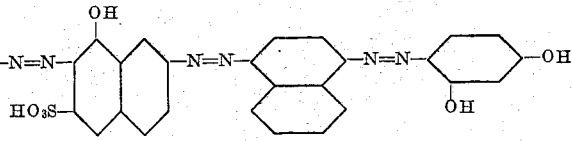

and dyes cotton in blue shades. By aftertreatment of the direct dyeing with 4-nitrodiazobenzene, black shades are obtained of good fastness to washing and of very good dischargeability.

If the 22 parts of 1:3-dihydroxybenzene in this example be replaced by 21.8 parts of 1-amino-3-hydroxybenzene, a dyestuff possessing similar properties is obtained.

If, in the above example, the 2-amino-8-hydroxynaphthalene-6-sulphonic acid be replaced by 1-amino-5-hydroxynaphthalene-7-sulphonic acid or 2-amino-5-hydroxynaphthalene-7-sulphonic acid, then, by using either 1:3-dihydroxybenzene or 1-amino-3-hydroxybenzene, dyestuffs are obtained which possess similar properties to the above. In the same manner, dyestuffs possessing similar properties to the above are also obtained if, in the preparation of the above products, the 1-amino-4-acetaminobenzene be replaced by 1-amino-2-methyl-4-acetaminobenzene or 1-amino-2:5-dimethyl-4-acetaminobenzene.

*Example 2*

23.9 parts of 2-amino-5-hydroxynaphthalene-7-sulphonic acid are dissolved in 300 parts of water with the addition of 30 parts of sodium carbonate. To this solution is added a solution obtained by diazotizing 28.0 parts of 1-amino-4-acetaminonaphthalene-6-sulphonic acid. After stirring for several hours, the mixture is neutralized with hydrochloric acid, a solution of 6.9 parts of sodium nitrite is added and, at 15° C., 28 parts of hydrochloric acid are poured in rapidly. After 1–1½ hours a solution of 14.3 parts of 1-aminonaphthalene, prepared by dissolving it in 300 parts of water with an addition of 13 parts of hydrochloric acid of 30 per cent strength, is stirred into the diazotizing mixture, to which ice has been added, in such a manner that the temperature is not allowed to rise above 20° C. By addition of sodium acetate solution of 20 percent strength the coupling mixture is made neutral to Congo red. After about 24 hours, the disazo dyestuff is precipitated by addition of common salt and is filtered off. The sodium salt of the filtered and pressed dyestuff is dissolved in 500 parts of hot water; the solution is brought to the boil, 80 parts of sodium hydroxide solution of 30 per cent strength are added and the reaction mixture is boiled for 1 hour with stirring. It is then neutralized with hydrochloric acid, cooled to 15° C. and the diaminodisazo dyestuff solution thus obtained is mixed with a solution of 13.8 parts of sodium nitrite and 55 parts of hydrochloric acid of 30 per cent strength and stirred for 1½–2 hours at 15° C. The suspension thus obtained is stirred into a solution containing 22.0 parts of 1:3-dihydroxybenzene and 60 parts of sodium carbonate in 300 parts of water. After stirring for several hours, the dyestuff, corresponding in the free state to the formula

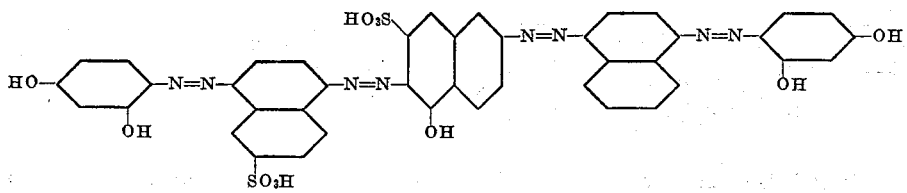

is precipitated by addition of about 10 per cent of common salt and is filtered off. It is a dark, bronzy powder which dissolves in water and in concentrated sulphuric acid to yield a blue solution. On cotton the dyestuff yields grey-blue dyeings which become fast to washing by aftertreatment with formaldehyde. By development with diazotized paranitraniline a grey is obtained.

If the 2-amino-5-hydroxynaphthalene-7-sulphonic acid be replaced by 2-amino-8-hydroxynaphthalene-6-sulphonic acid, a similar dyestuff is obtained which dyes cotton in blue-grey shades; its dyeings, when aftertreated with formaldehyde, possess a remarkably good fastness to washing.

If, in place of 1-aminonaphthalene, 1-amino-2-methoxynaphthalene or 1-amino-2-methoxynaphthalene-6-sulphonic acid be used, dyes are obtained which yield pure blue shades which become fast to washing by aftertreatment with formaldehyde. By development with diazotized paranitraniline, grey dyeings are obtained in this instance also.

*Example 3*

23.9 parts of 2-amino-5-hydroxynaphthalene-7-sulphonic acid are dissolved in 300 parts of water with the addition of 30 parts of sodium carbonate. This solution is then mixed with a solution of the diazo compound of 18.0 parts of 4-amino-phenyloxamic acid, prepared in known manner. After stirring for several hours, the mixture is neutralized with hydrochloric acid, a solution of 6.9 parts of sodium nitrite is added and, at 15° C., 28 parts of hydrochloric acid of 30 per cent strength are added quickly. After 1½ hours the sparingly soluble diazo compound is filtered off; it is then stirred with 100 parts of ice and 200 parts of water and a neutral solution of 25.3 parts of 1-amino-2-methoxynaphthalene-6-sulphonic acid and 13.3 parts of sodium hydroxide solution of 30 per cent strength in 200 parts of water is stirred in. After 24 hours the coupling mixture is made up to a volume of 800 parts by volume and brought to the boil; 110 parts of sodium hydroxide solution of 30 per cent strength are added, and the mixture is stirred for about 1 hour at the boil, after which it is almost neutralized with hydrochloric acid. The disazo dyestuff is then precipitated by addition of common salt and filtered off. The thoroughly pressed dyestuff is now stirred well with 400 parts of water and 200 parts of ice, mixed with a solution of 13.8 parts of sodium nitrite and 55 parts of hydrochloric acid of 30 per cent strength and stirred for 2–3 hours at 0–5° C. The tetrazo compound thus obtained is next stirred into a solution containing 200 parts of water, 22.0 parts of 1.3-dihydroxybenzene, 22.0 parts of sodium carbonate, and 100 parts of pyridine at 0° C. The dyestuff formed, which, in the free state, corresponds with the formula

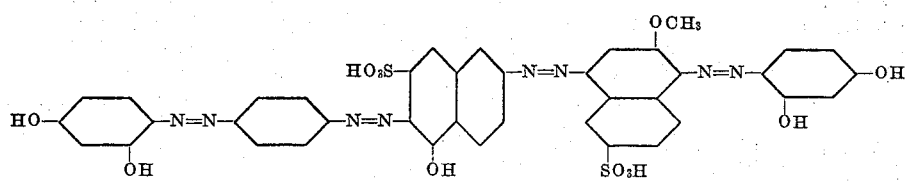

has almost completely precipitated after stirring for several hours and can then be filtered off. When dry, it is dark, bronzy powder which dissolves in water to give a blue-violet, in concentrated sulphuric acid to yield a pure blue colour. It dyes cotton in reddish-blue shades; by aftertreatment of the dyeings with formaldehyde their fastness to washing is improved.

A dyestuff possessing very similar properties is obtained if, in the above example, 1-amino-2-methoxynaphthalene be used in place of 1-amino-2-methoxynaphthalene-6-sulphonic acid.

*Example 4*

As described in Example 1, the diazo compound from 15.0 parts of 1-amino-4-acetaminobenzene is combined with 23.9 parts of 2-amino-8-hydroxynaphthalene-6-sulphonic acid. To the coupling mixture, neutralized with hydrochloric acid, a solution of 6.9 parts of sodium nitrite is added, and, at 15° C., 28 parts of hydrochloric acid of 30 per cent strength are poured in quickly. After 1½ hours' stirring the sparingly soluble diazo compound is filtered off at the pump and is then stirred with 100 parts of ice and 200 parts of water; it is made neutral to Congo red by addition of a solution of sodium acetate of 20 per cent strength and a solution of 22.3 parts of 1-aminonaphthalene-6-sulphonic acid in 200 parts of water, made neutral with caustic soda, is added at room temperature. Coupling is complete after 5–6 hours. The mixture is neutralized with caustic soda and brought to the boil, 110 parts of a sodium hydroxide solution of 30 per cent strength are added, and the mixture is boiled for 1–1½ hours with stirring, after which it is neutralized with hydrochloric acid, cooled to 15° C. and the diaminodisazo dyestuff solution is mixed with a solution of 13.8 parts of sodium nitrite and 55 parts of hydrochloric acid of 30 per cent strength and stirred for ½-2 hours at 15° C. The suspension thus obtained is stirred into a solution containing 22.0 parts of 1:3-dihydroxybenzene and 60 parts of sodium carbonate in 300 parts of water. After stirring for several hours, the dyestuff solution. After filtering and drying it is a dark, bronzy powder which dissolves in water with a red-violet, in concentrated sulphuric acid with a bluish-green colour. The dyestuff, which in the free state probably corresponds to the formula

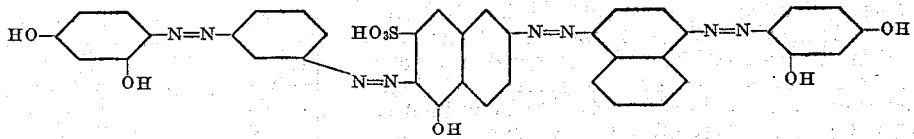

precipitated dyestuff, which, in the free state, probably corresponds to the following formula dyes cotton in violet shades. By aftertreatment with 4-nitro-diazobenzene, the direct dyeings

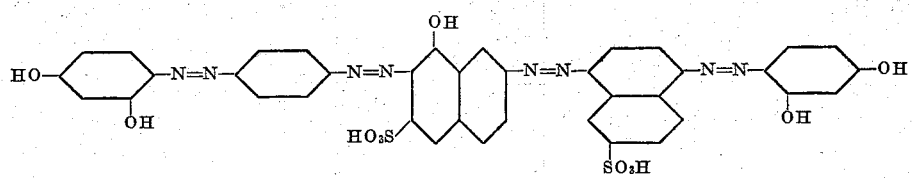

can be filtered off. When dry, it is a very bronzy powder which dissolves in water with a violet and in sulphuric acid conc. with a blue colour. It dyes in blue shades. By aftertreating the direct dyeings with 4-nitrodiazobenzene, greenish-black shades are obtained which are of good fastness to washing and of very good neutral and alkaline dischargeability.

*Example 5*

23.9 parts of 2-amino-5-hydroxynaphthalene-7-sulphonic acid and 30 parts of sodium carbonate are dissolved in 300 parts of water. This solution is combined with the diazo compound obtained in known manner from 18.0 parts of 3-amino-phenyloxamic acid. After stirring for several hours, the coupling mixture is neutralized with hydrochloric acid, a solution of 6.9 parts of sodium nitrite is added and, at 15° C. 28 parts of hydrochloric acid of 30 per cent strength are poured in quickly. After 1 to 1½ hours, ice is added to the diazotizing mixture, and a solution of 14.3 parts of 1-amino-naphthalene, prepared by dissolving it in 300 parts of water with addition of 13 parts of hydrochloric acid of 30 per cent strength, is added in such a manner that the temperature does not rise above 20° C. The coupling mixture is then made neutral to Congo red by addition of sodium acetate solution of 20 per cent strength. After about 30-40 hours, when the coupling is complete, the reaction mixture is heated to 60° C., and the disazo dyestuff is separated by filtration. The pressed dyestuff is then stirred up with 1400 parts of water, the suspension is brought to the boil, 220 parts of sodium hydroxide solution of 30 per cent strength are added, and the whole is stirred at the boil for 1-1½ hours. The reaction mixture is then neutralized with hydrochloric acid and cooled to 15° C., and the diamino-disazo dyestuff solution is mixed with a solution of 13.8 parts of sodium nitrite and 55 parts of hydrochloric acid of 30 per cent strength and stirred for 1½-2 hours at 15° C. The suspension thus obtained is then stirred into a solution of 22.0 parts of 1:3-dihydroxybenzene and 60 parts of sodium carbonate in 300 parts of water. The reaction mixture is stirred for several hours at room temperature, after which it is heated to 70-80° C. The dyestuff is precipitated by addition of about 10 per cent of common salt, calculated on the volume of the yield violet-brown shades of good fastness to washing and of very good dischargeability.

If, in the above example, 2-amino-8-hydroxynaphthalene-6-sulphonic acid or 1-amino-5-hydroxynaphthalene-7-sulphonic acid be used in place of 2-amino-5-hydroxynaphthalene-7-sulphonic acid, dyestuffs possessing similar properties are obtained.

*Example 6*

A dyebath is prepared consisting of 1000 parts of water, 1 part of dyestuff (prepared according to the first paragraph of Example 1), 1 part of anhydrous sodium carbonate, and 15 parts of sodium sulphate. 50 parts of cotton are entered into this bath at 40-50° C., when it is raised gradually to the boil and boiled for 1 hour. The cotton is then rinsed.

The blue dyeing thus obtained is then entered into a fresh, cold bath containing, per litre, the diazo solution obtained by diazotizing 20 parts of 4-nitro-1-aminobenzene with 50 parts of hydrochloric acid of 30 per cent strength and 10 parts of sodium nitrite and neutralizing with 10 parts of soda ash and 20 parts of sodium acetate. After turning the cotton in this bath for ½ hour it is rinsed. A deep black dyeing is obtained which is of very good fastness to water and washing and of excellent dischargeability, with both neutral and alkaline discharges.

*Example 7*

A dyebath is prepared consisting of 1000 parts of water, 1 part of the dyestuff prepared according to the first paragraph of Example 2, 1 part of anhydrous sodium carbonate and 15 parts of sodium sulphate, 50 parts of cotton are entered therein at 40-50° C.; the bath is then raised gradually to the boil, and boiling is continued for 1 hour. The cotton is then rinsed.

The blue dyeing thus obtained is then entered into a second bath containing 3 per cent of formaldehyde solution of 40 per cent strength and 1 per cent of acetic acid of 40 per cent strength (both calculated on the weight of the dyed material), the ratio of material to dyebath liquor remaining the same as before. After turning the cotton for ½ hour it is rinsed. The dyeing will be found to have become appreciably faster to washing.

What we claim is:

2. The tetrakisazodyestuff corresponding in the free state to the formula

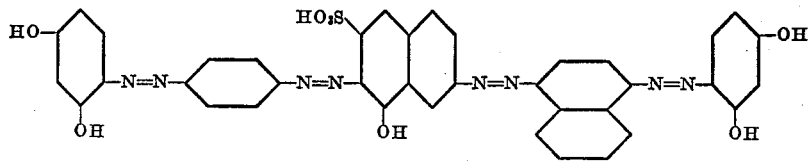

3. The tetrakisazodyestuff corresponding in the free state to the formula

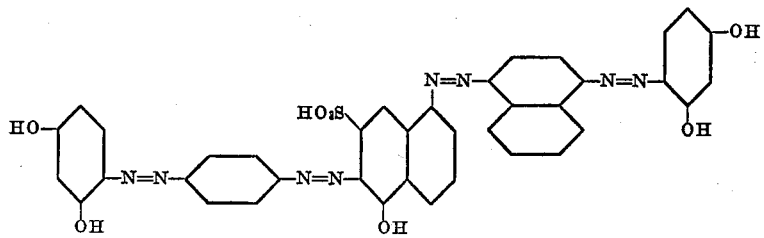

1. The new dyestuffs which, in the free form, correspond to the general formula

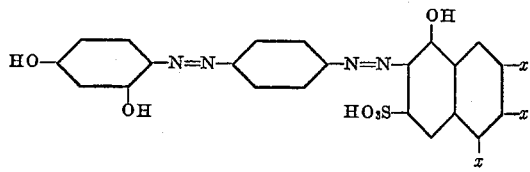

in which two of the groups symbolized by $x$ are hydrogen atoms and one $x$ represents a disazo radical of the general formula

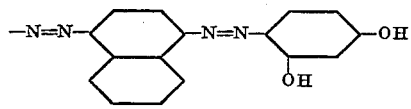

JOSEF GYR.
RAYMOND GUNST.